(12) United States Patent
Le Bars et al.

(10) Patent No.: US 7,684,785 B2
(45) Date of Patent: Mar. 23, 2010

(54) METHOD OF COMMUNICATION IN A NETWORK

(75) Inventors: Philippe Le Bars, Thorigne-Fouillard (FR); Francois Thoumy, Vignoc (FR)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 10/331,477

(22) Filed: Dec. 31, 2002

(65) Prior Publication Data
US 2003/0129966 A1 Jul. 10, 2003

(30) Foreign Application Priority Data
Jan. 8, 2002 (FR) .................................. 02 00175

(51) Int. Cl.
*H04Q 7/20* (2006.01)
(52) U.S. Cl. .................. 455/411; 370/338; 713/168
(58) Field of Classification Search ............. 455/410, 455/411, 414.1, 418, 435.1, 574, 573, 127.1, 455/127.2, 343.1, 562.1, 561, 575.7, 426.2, 455/436, 444; 370/318, 311, 338, 349, 350, 370/389, 445; 713/168, 171
See application file for complete search history.

(56) References Cited

U.S. PATENT DOCUMENTS

| | | | |
|---|---|---|---|
| 5,835,061 A * | 11/1998 | Stewart | 342/457 |
| 6,618,584 B1 * | 9/2003 | Carneheim et al. | 455/411 |
| 6,961,762 B1 * | 11/2005 | Yeap et al. | 709/221 |
| 2003/0081583 A1 * | 5/2003 | Kowalski | 370/338 |
| 2003/0091030 A1 * | 5/2003 | Yegin et al. | 370/352 |
| 2003/0125057 A1 * | 7/2003 | Pesola | 455/502 |
| 2004/0214572 A1 * | 10/2004 | Thompson et al. | 455/435.2 |

FOREIGN PATENT DOCUMENTS

| | | |
|---|---|---|
| EP | 0490441 | 6/1992 |
| FR | 2809897 | 12/2001 |
| WO | 95/31080 | 11/1995 |
| WO | 01/93619 | 12/2001 |

* cited by examiner

*Primary Examiner*—George Eng
*Assistant Examiner*—Khawar Iqbal
(74) *Attorney, Agent, or Firm*—Fitzpatrick, Cella, Harper & Scinto

(57) ABSTRACT

In a wireless communication network comprising at least one mobile terminal and an access point, the access point detects a beacon signal transmitted by a mobile terminal, and transmits a beacon signal in place of a given mobile terminal if it detects that the given mobile terminal transmits a beacon signal. The mobile terminal, on the other hand, stops transmitting the beacon signal and receives the beacon signal transmitted by the access point.

4 Claims, 8 Drawing Sheets

METHOD OF COMMUNICATION IN A NETWORK

BACKGROUND OF THE INVENTION

The present invention relates to a method of communication in a network.

The invention is in the field of wireless networks. These networks may be highly centralized, have one base station which manages the whole network and allocates network access to the various members, or else may be more distributed, that is to say that the decisions about network access are the result of one or more terminals deciding the rights of network access for themselves or for the others.

These networks have in common the fact of having a channel for network management information, sometimes called the "beacon channel", and a channel for the user information, carrying data known as "payload data". The beacon channel is normally managed by the base station, which is in principle connected to a wired network of telephone or data type. The terminal is capable of transmitting a certain amount of information to the base station, in order to describe its own situation in relation to the network.

The commencement of the existence of a wireless network, on switching on the elements which make it up, is generally characterized by the presence of a beacon channel. Usually, this beacon channel is attributed to a base station which is an access point to a wired network.

Among the existing systems, i.e. principally systems conforming to the DECT (Digital Enhanced Cordless Telecommunications) standard or to variants of it, two main categories may be identified: either a base station or an access point begins to transmit over a beacon channel as soon as it is turned on, or a mobile terminal that is turned on detects the lack of a beacon channel and declares itself to be a base station, whether or not it is an access point.

However, such systems are not relevant in the case where the network under consideration is a mixed network, that is to say having a wired part and a wireless part, where the access points are multiple and linked to the same wired network. Such a mixed network is shown in FIG. 1. The references MT0 and MT1 in the Figure represent mobile terminals and AP0, AP1, and AP2 represent access points linked to the same wired network.

SUMMARY OF THE INVENTION

The object of the present invention is to remedy the disadvantages described above.

To that end, the present invention provides a communication method in a wireless communication network comprising at least one access point and one mobile terminal, remarkable in that it comprises steps according to which:
  the mobile terminal explores the time-frequency domain to detect a beacon signal;
  in the absence of a beacon signal, the mobile terminal transmits a mobile beacon signal in a predetermined time window; and
  on detection of a beacon signal transmitted by an access point, the mobile terminal stops transmitting the mobile beacon signal.

Thus, at the initiative of a mobile terminal, a temporary wireless network is created between the pre-existing mobile terminals and access points. If there is no need for this network, no transmission takes place on the beacon channel. In other words, the network is only put into operation in the presence of a person operating his or her mobile terminal.

An advantage of the present invention is that it makes it possible to save energy.

Furthermore, the present invention makes it possible to avoid congesting the radio frequency space when there is no network user, since the temporary network is cut off in that case.

With the same object as that indicated above, the present invention also provides a communication method in a wireless communication network comprising at least one access point and one mobile terminal, remarkable in that it comprises steps according to which, on reception of a first beacon signal transmitted by a mobile terminal:
  the access point triggers an authentication procedure with the mobile terminal; and
  in case the authentication procedure is successful, the access point transmits a second beacon signal, as a result of which a temporary network is created.

According to a particular feature, on reception of the first beacon signal by the access point:
  the access point carries out a time synchronization operation with respect to the mobile terminal;
  the access point sends the mobile terminal a first authentication message;
  the mobile terminal sends the access point back a response to the first authentication message, followed by a second authentication message;
  the access point sends the mobile terminal back a response to the second authentication message;
  the access point carries out an operation of authentication of the mobile terminal;
  the mobile terminal carries out an operation of authentication of the access point;
  if the authentication operations are successfully carried out, the access point transmits the second beacon signal.

This feature makes it possible to guarantee not only that the mobile terminal is connected to an access point over which it has rights, but also that the access point is connected to a mobile terminal which has access rights to the network. This makes attempts at fraudulent access more difficult.

According to a particular feature, when the mobile terminal has terminated its connection, if, after a predetermined period has passed, the access point detects no new connection of a mobile terminal, the access point stops transmitting the second beacon signal, as a result of which the temporary network is cut off.

This enables an energy saving to be made, since the temporary network is only maintained if necessary.

According to a particular feature, the first and second authentication messages contain a random number and, at the time of the operation of authentication of the mobile terminal:
  the access point sends the mobile terminal a random number;
  the access point and the mobile terminal each perform a predetermined calculation based on this random number,
  the mobile terminal sends the access point back the result of the calculation it has obtained,
  the access point compares this result with the result it has obtained and
  the access point authenticates the mobile terminal if the two results are identical.

According to a particular feature, the first and second authentication messages contain a random number and, at the time of the operation of authentication of the access point:
  the mobile terminal sends the access point a random number, the access point and the mobile terminal each perform a predetermined calculation based on this random number, the access point sends the mobile terminal back the result of the calculation it has obtained, the mobile terminal compares this result with the result it has obtained and the mobile terminal authenticates the access point if the two results are identical.

By virtue of the above two particular features, in which the transmission of a random number makes the connection non-deterministic from one occasion to the next, security is enhanced.

With the same object as that indicated above, the present invention also provides a mobile terminal in a wireless communication network comprising at least one access point, remarkable in that it comprises:

a module for exploration of the time-frequency domain, adapted to detect a beacon signal;

a transmission module, adapted to transmit, within a predetermined time window, in the absence of a beacon signal, a mobile beacon signal, and to stop transmitting the mobile beacon signal on detection of a beacon signal transmitted by an access point.

According to a particular feature, the mobile terminal further comprises an authentication module.

According to a particular feature, the authentication module comprises a module for random number generation.

Still with the same object, the present invention further provides an access point in a wireless communication network comprising at least one mobile terminal, remarkable in that it comprises:

a module for triggering an authentication procedure with a mobile terminal, on reception of a first beacon signal transmitted by this mobile terminal; and a module for transmitting a second beacon signal, in case the authentication procedure is successful, as a result of which a temporary network is created.

According to a particular feature, the access point further comprises a module for time synchronization with respect to the mobile terminal.

According to a particular feature, the access point further comprises an authentication module.

According to a particular feature, the authentication module comprises a module for random number generation.

The present invention also relates to a microcontroller, comprising means adapted to implement a communication method as above.

The present invention also relates to an FPGA (Field Programmable Gate Array), comprising means adapted to implement a communication method as above.

The present invention also relates to a telecommunications network, comprising means adapted to implement a communication method as above.

The present invention also relates to a digital signal processing apparatus, comprising means adapted to implement a communication method as above.

The invention also relates to:

an information storage means which can be read by a computer or a microprocessor storing instructions of a computer program, making it possible to implement a communication method as above, and an information storage means which is removable, partially or totally, which can be read by a computer or a microprocessor storing instructions of a computer program, making it possible to implement a communication method as above.

The invention also relates to a computer program product containing sequences of instructions for implementing a communication method as above.

As the advantages of the mobile terminal and of the access point as well as the particular features and advantages of the microcontroller, of the FPGA, of the telecommunications network, of the digital signal processing apparatus, of the different storage means and of the computer program product are similar to those of the communication method according to the invention, they are not repeated here.

Other aspects and advantages of the invention will emerge from a reading of the following detailed description of a particular embodiment, given by way of non-limiting example.

DETAILED DESCRIPTION OF THE PREFERRED EMBODIMENTS

The object of the present invention is to create a beacon channel and thereby a wireless network, at the initiative of the mobile terminal, then to re-attribute this beacon channel to a point of access to the wired network, at the same time as the management of the access to the wireless network.

Figure 1:
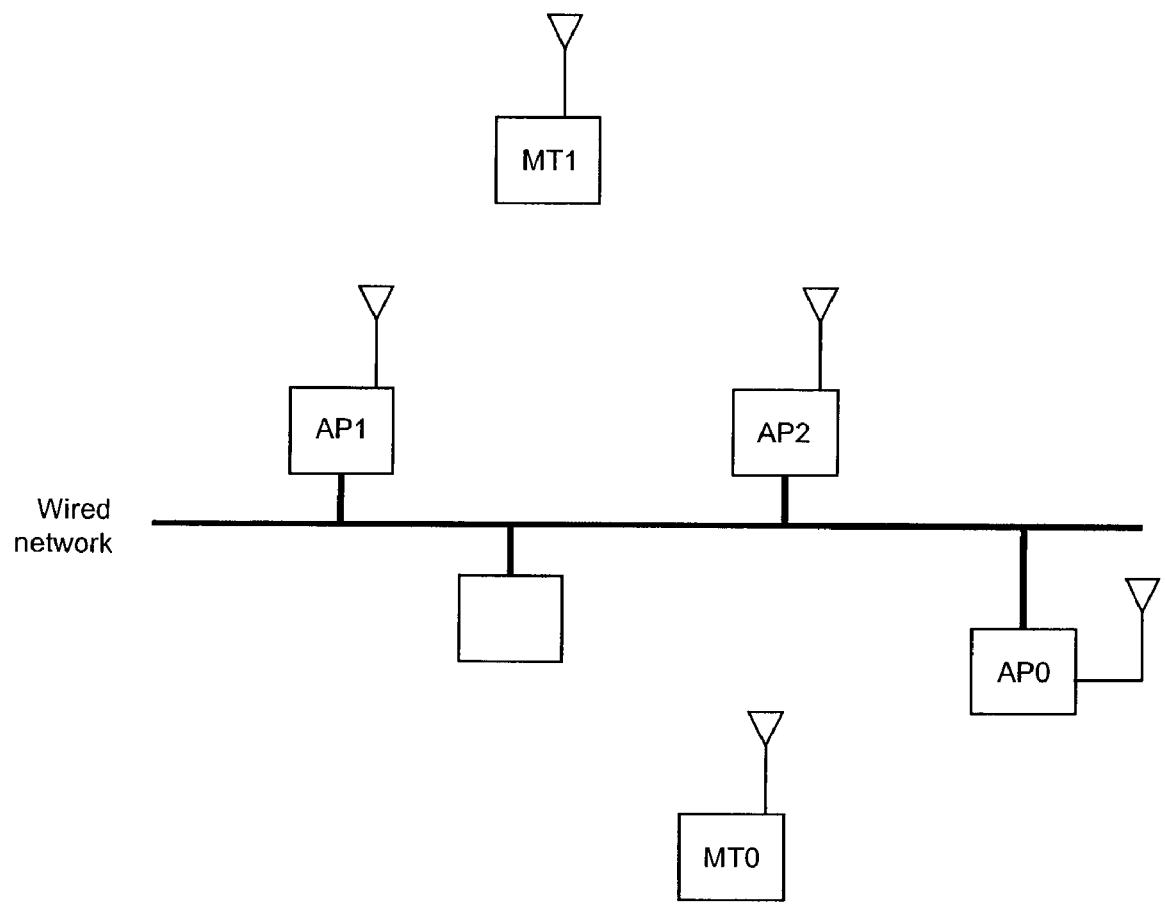
FIG. 1, already described, is a diagram of a hybrid telecommunications network example, that is to say comprising a wired part and a wireless part, this network being adapted to implement the present invention.

In a network such as that of FIG. 1 described above, all the terminals, whether they be mobile terminals or base stations, are capable of transmitting and receiving information over at least one beacon channel, in addition to their minimum capability of receiving or transmitting over a signaling channel, and vice-versa.

The mobile items of equipment must be capable of measuring a period of time.

The mobile terminals, as for the access points, possess an authentication system as well as an authentication key. This authentication key is held in a memory. This memory may be pre-loaded by the manufacturer or by a suitable system, as for example in a procedure for terminal—base station association by means of a cable, the manufacturer having pre-loaded the key in one of the two elements.

Figure 2:
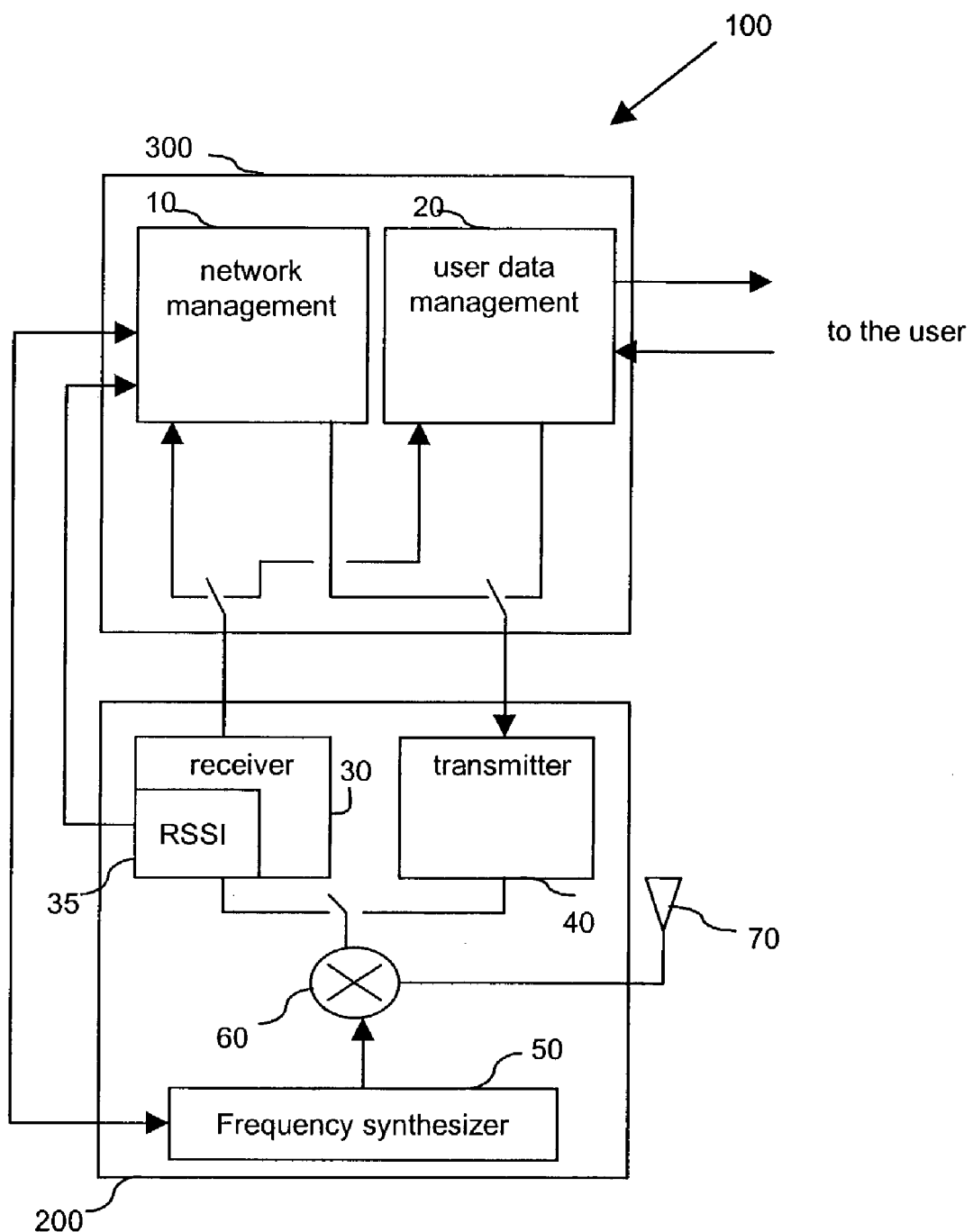
FIG. 2 is a diagram of the architecture of a mobile station or a base station of the network of FIG. 1, adapted to implement the present invention.

FIG. 2 shows the simplified architecture of an element of a network of the type of that in FIG. 1.

A transmitter-receiver 100 of the network comprises a radio module 200 and a data processing module 300 which contains a user data management module 20 as well as a network management module 10. This management module may create a beacon channel and receive the information from the signaling channel, or else it may create the signaling information and receive the beacon channel.

The radio module contains a frequency synthesizer 50 which is programmable by the network management module 10. This frequency synthesizer, with the aid of a mixer 60, makes it possible to modulate or demodulate the signals coming from

- a radio transmitter module 40, which transforms the binary signals output from the management modules 10 and 20 into a modulatable signal or
- a radio receiver module 30, which transforms the radio frequency signals into binary data understandable by the management modules 10 and 20.

An antenna 70 provides the interface with the outside.

The receiver module 30 contains an RSSI (Received Signal Strength Indicator) 35 which sends an indication to the management module 10.

Figure 3:
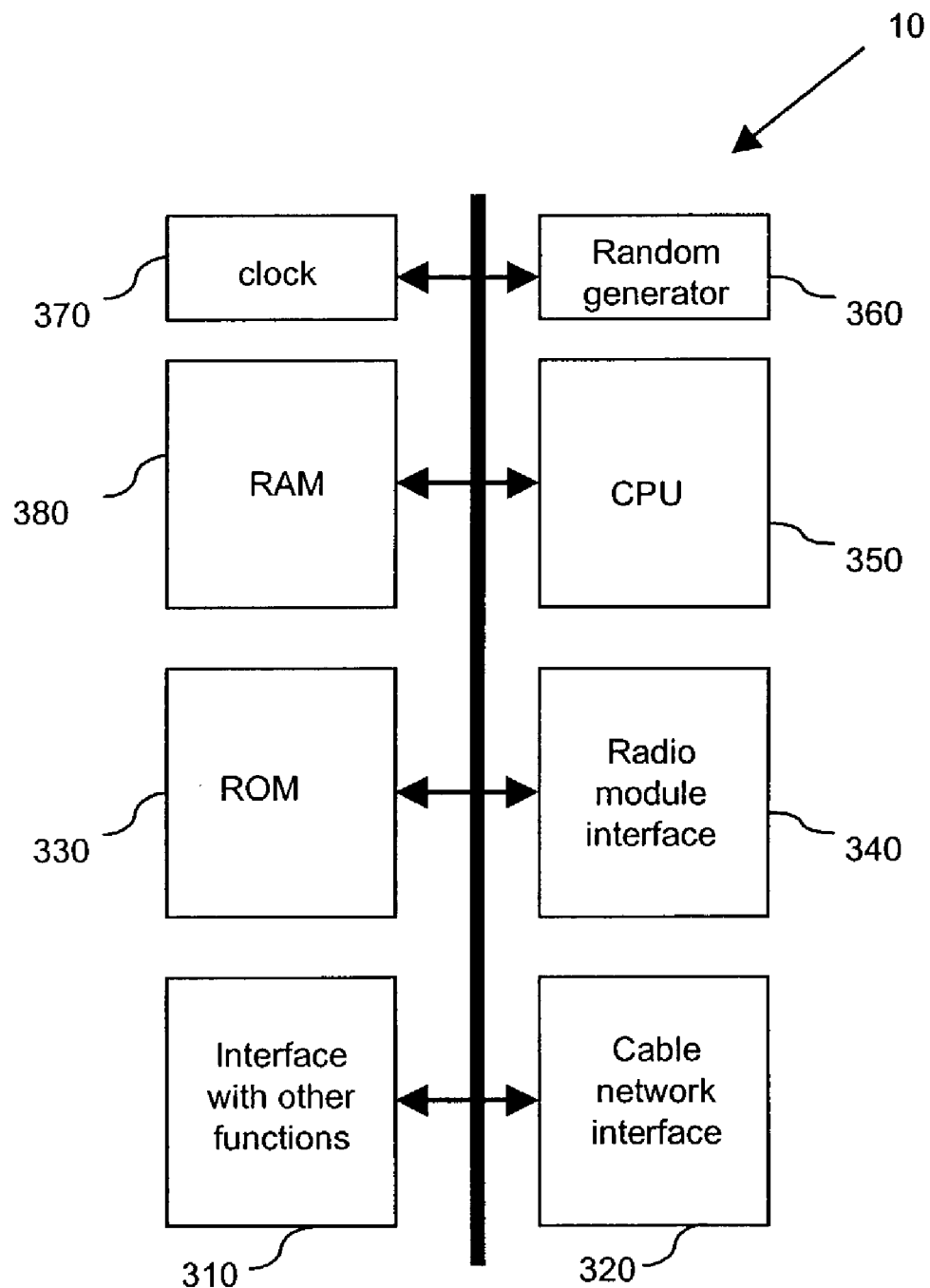
FIG. 3 is a diagram of the architecture of a network management module included in a mobile station or base station of the network of FIG. 1.

FIG. 3 shows a possible architecture for the network management module 10.

This may be implemented with the use of conventional functions of a microcalculator. A clock 370 makes it possible to have a time base and to create time-outs.

A RAM memory 380 enables a large amount of data to be stored, a ROM memory 330 enables storage of the program to be executed, while a central processing unit 350 enables the sequential execution to be carried out of a certain number of instructions stored in ROM 330 or in RAM 380.

A random generator 360 which, as a variant, may be implemented purely in software form, is necessary. A radio module interface 340 enables the frequency synthesizer 50 to be driven. There may of course be an interface with other functions 310, whose processing it may be wished to integrate, as well as an interface with the wired or cabled network 320 if the member of the network under consideration is an access point.

Figure 4:
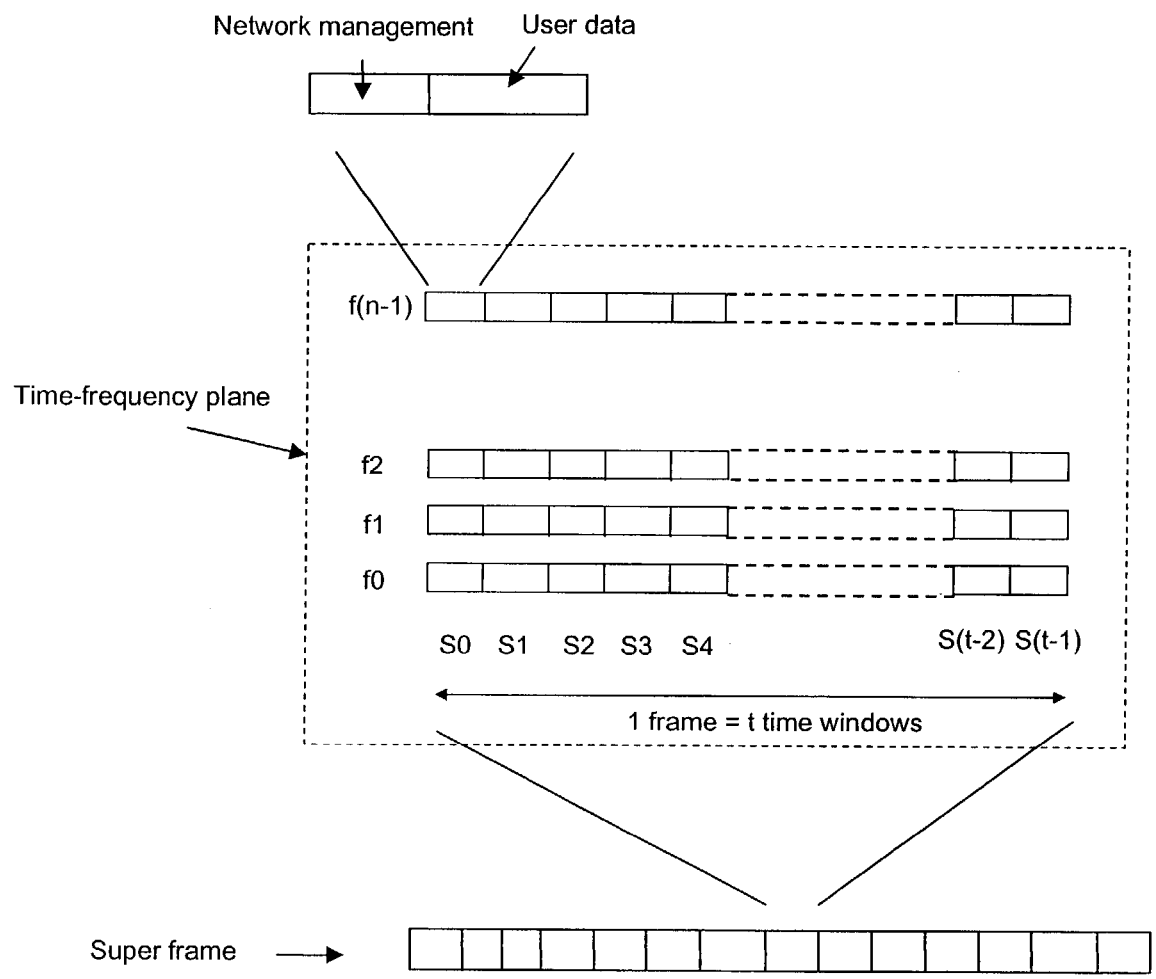
FIG. 4 shows the time-frequency domain used for communication in the network of FIG. 1.

As shown in FIG. 4, which illustrates the time-frequency domain used by the network, the structure of the network is such that a frame comprises several time windows, it being possible to attribute each window to a member of the network for the transmission of a signal. For each new frame, a given member of the network systematically uses that window until the end of the connection.

In each window, network management information as well as user data information are transmitted. The entirety of the management information is transmitted over several frames. This group is called a "super frame".

Figure 5:
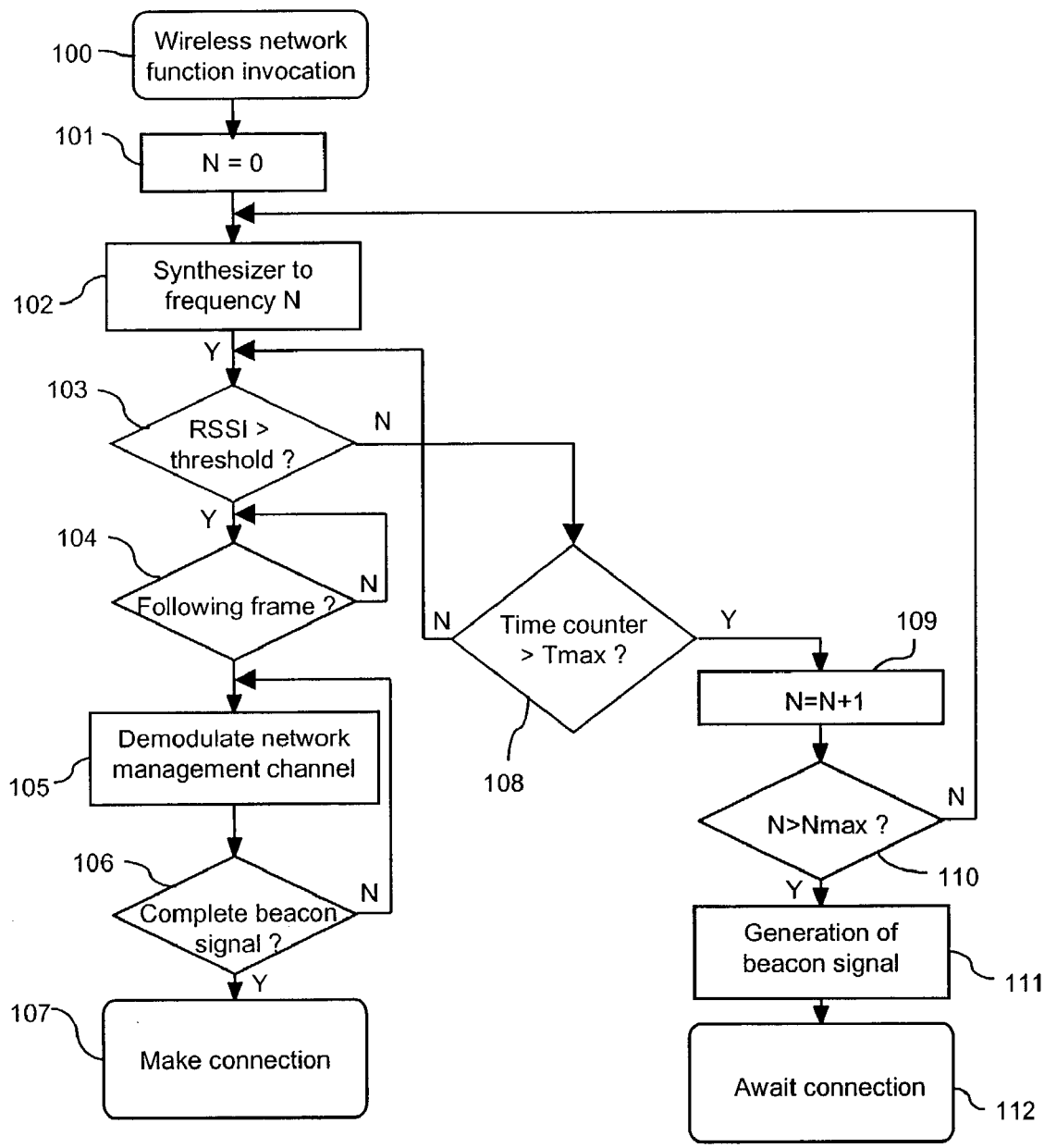
FIG. 5 is a flow diagram illustrating the start of sequence for a mobile terminal, according to the present invention, in a particular embodiment.

The flow chart of FIG. 5 shows the succession of operations carried out by a mobile terminal, in accordance with the present invention. Let Nmax be the number of frequencies used by the network and let Tmax be a period greater than the transmission period of a frame.

When the user decides to use the wireless network from the mobile terminal which accompanies him, he communicates this intention via the man-machine interface. The mobile terminal then receives this call (step 100).

The terminal then initializes a register N with the value zero (step 101), then programs its frequency synthesizer to the frequency which corresponds to this index N=0 (step 102).

Then, for a period Tmax counted by a counter (test 108), the mobile terminal monitors the RSSI signal which gives it information on the energy received at the antenna (test 103). If this energy remains below a predetermined threshold, it is considered that no signal is received. The threshold is determined from constraints of the network, such as the admitted useful range and the power at the transmitter as well as the minimum required signal to noise ratio.

If a signal is received, the terminal awaits the following frame (test 104) to demodulate the management channel of the network (step 105) until a complete beacon signal is obtained normally, that is to say a complete super frame (test 106). When this is obtained, the connection-making procedure commences (step 107).

This branch has just described the case in which a network was preexisting. The connection is then made in a conventional manner.

If, during the whole period Tmax, the RSSI signal remained below the threshold (test 108 positive), then the index N is incremented by one unit (step 109).

If the number N is below the value of Nmax, the mobile terminal returns to step 102 and synthesizes the frequency corresponding to the index N+1.

If the number N is greater than the number Nmax (test 110 positive), it is considered that the terminal has explored the whole time-frequency domain and has not found any preexisting network there. It must then create this network. To do this, it transmits (step 111) a beacon signal in a time window and at a frequency of its choice, and waits for a connection to be established (step 112).

Figure 6:
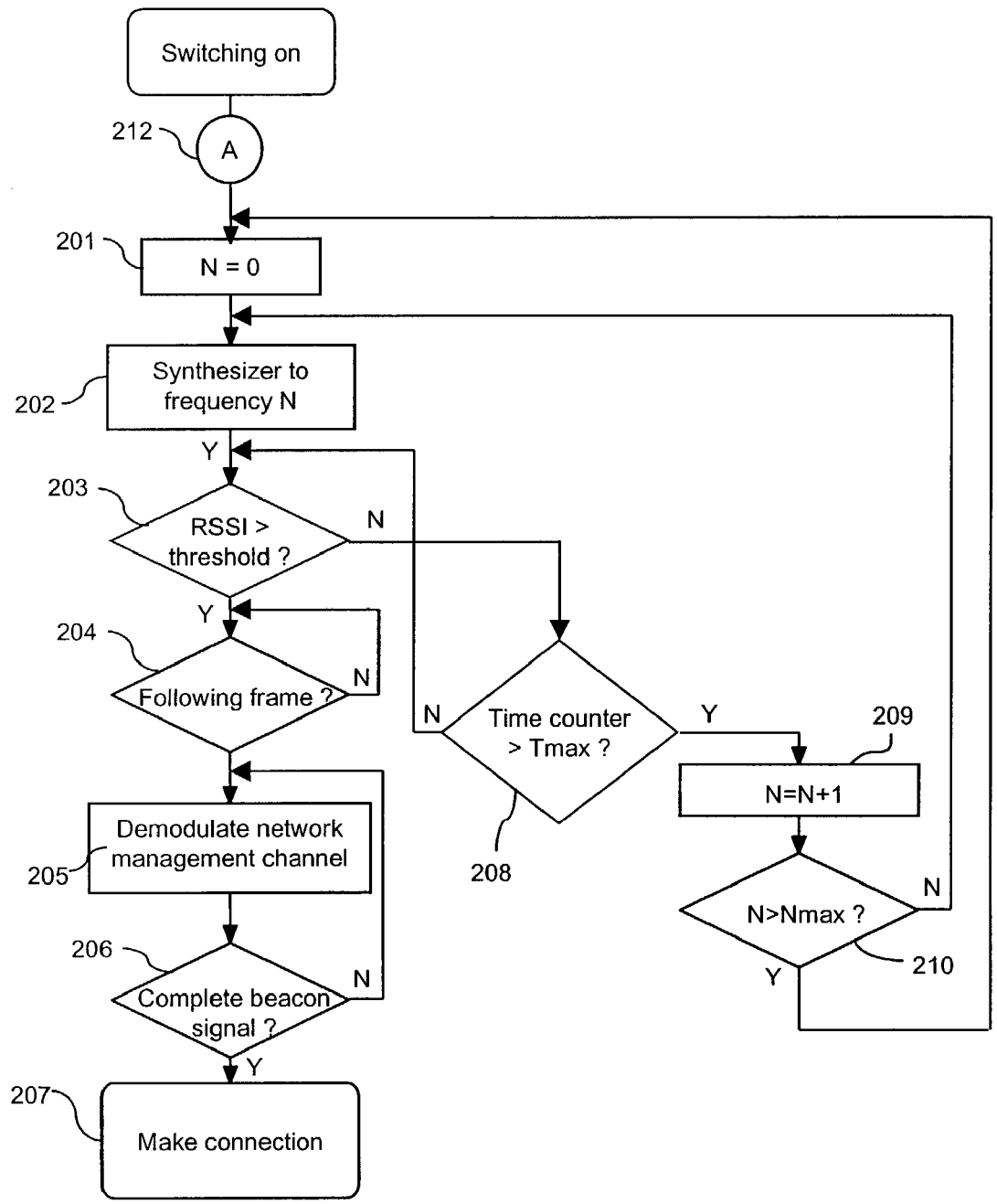
FIG. 6 is a flow diagram illustrating the start of sequence for an access point, according to the present invention, in a particular embodiment.

The flow chart of FIG. 6 shows the succession of operations carried out by an access point belonging to the potential network.

On turning on, the access point initializes a register N with the value zero (step 201), then programs its frequency synthesizer to the frequency which corresponds to this index N=0 (step 202).

Next, for a period Tmax (test 208), the access point monitors the RSSI signal which gives it information on the energy received at the antenna (test 203). If this energy remains below a predetermined threshold, it is considered that no signal is received.

If a signal is received, the access point awaits the following frame (test 204) to demodulate the management channel of the network (step 205) until a complete beacon signal is obtained normally, that is to say a complete super frame (test 206). When this is obtained, a conventional connection-making procedure is commenced (step 207).

If, during the whole period Tmax, the RSSI signal remained below the threshold (test 208 positive), then the index N is incremented by one unit (step 209).

If the number N is below the value of Nmax, the access point returns to step 202 and synthesizes the frequency corresponding to the index N+1.

If the number N is greater than the number Nmax (test 210 positive), the access point returns to waiting for a beacon signal starting from step 201.

Figure 7:
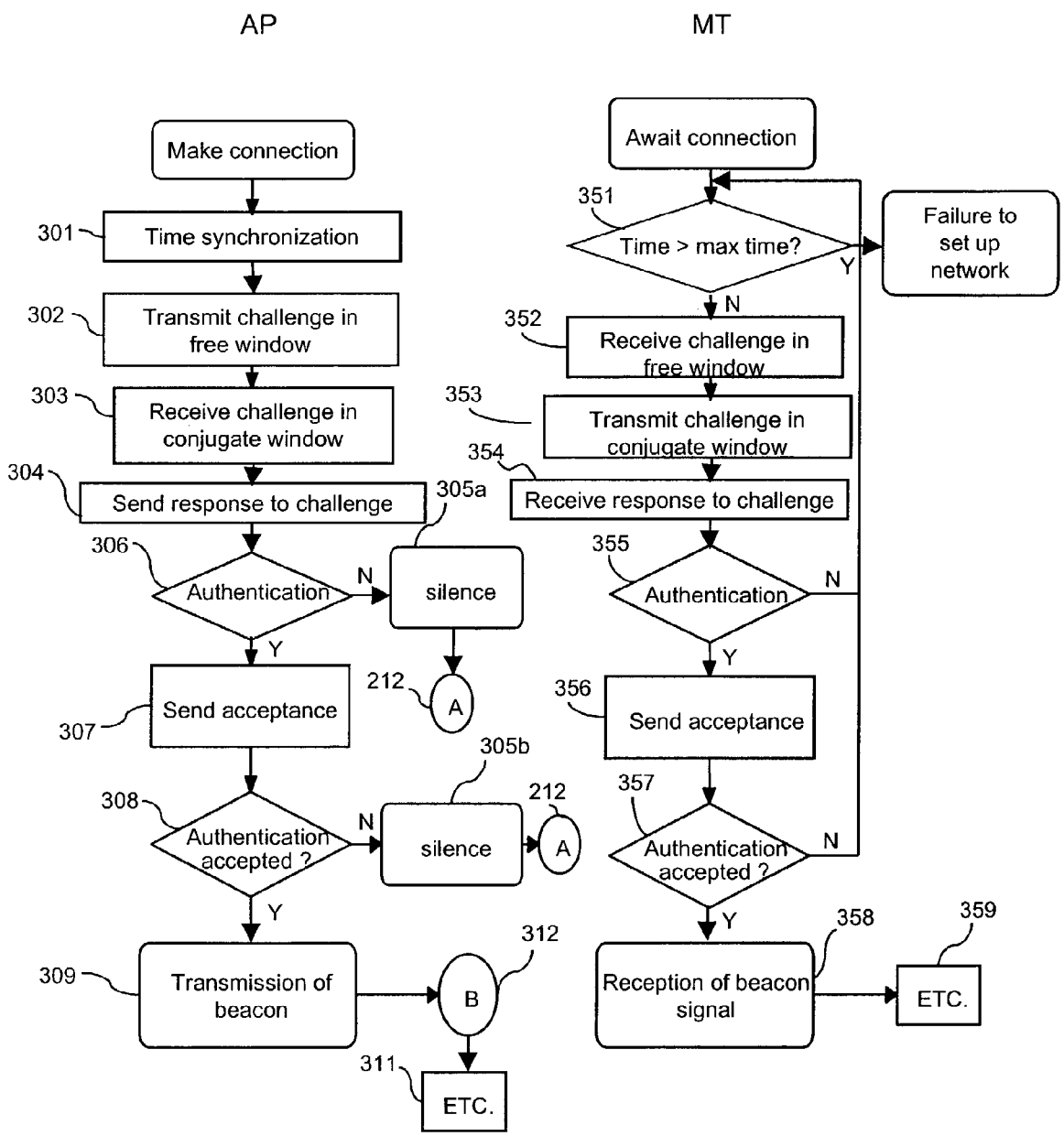
FIG. 7 is a flow diagram illustrating the creation of a temporary network at the initiative of a mobile terminal, according to the present invention, in a particular embodiment.

The flow chart of FIG. 7 shows the actual creation of the network, that is to say the first connection between access point and terminal. For ease of understanding, the steps corresponding to the access point (denoted AP in the drawing) are placed opposite those corresponding to the mobile terminal (denoted MT in the drawing).

After connecting the access point, a time synchronization step 301 is carried out. The beacon channel indicates the frequency-time windows domain, and so the access point knows, after complete reception of a super frame, in which window and at which frequency the terminal will be listening.

When this synchronization has been achieved, the access point transmits, in any one of the time windows, the fact that the terminal is listening (step 302).

In parallel, while awaiting a connection, the mobile terminal carries out a test 351 which makes it possible to indicate the failure of the commencement of the network if for example no access point that is on has been detected after a period "max time".

The transmission made by the access point at step 302 contains a specific so-called "challenge" message. It is a random number destined to be encoded with the use of a private key algorithm. Let there be two entities A and B wishing to authenticate each other. The entities A and B both know the same key and will use the same encryption algorithm. A sends a random number to B. A and B carry out a predefined calculation with this random number as operand. Next, B sends A the result of its calculation. A then compares this result with its own result and if the two are identical, A has authenticated B.

This challenge is received at step 352 by the mobile terminal, which transmits the response to the challenge within the conjugate time window (or slot), followed by a new challenge.

It should be recalled that each communication between A and B uses a slot for the transmission from A to B and a slot for the transmission from B to A, and that these two slots are said to be conjugates of each other.

This message is received by the access point at step 303. At step 353, the mobile terminal sends the access point a message with the response to the challenge sent out by the access point as well as a challenge which it has created. At step 304, the access point sends a message back to the mobile terminal with the response to the challenge sent out by the mobile terminal.

The mobile terminal receives this response at step 354. Here, of course, the procedure has been simplified and account has not been taken of possible re-transmissions in case of error, the correct transmission of the data being ensured by the person skilled in the art knowing these methods.

The access point, having sent out a challenge and received a response, can authenticate the mobile terminal at step 306. If the authentication fails, the access point ceases all transmission at step 305a and remains silent, then resumes the process from the connector A 212, that is to say at step 201 of FIG. 6.

If the authentication is successfully carried out, the access point sends a message to the mobile terminal to inform it of this (step 307), then awaits the confirmation of its own authentication by the mobile terminal (step 308). If this confirmation is not received, as previously, the access point becomes silent (step 305b) then resumes the process in A (212), that is to say at step 201 of FIG. 6.

Otherwise, at a step 309, the confirmation of the authentication having been received, the access point undertakes the transmission of the beacon signal.

Thus, a temporary network is created and its existence continues in a conventional manner, as shown in the drawing by "ETC." (step 311).

For the mobile terminal, on reception from the access point of the response to the challenge coming from the mobile terminal, the verification of whether or not the access point belongs to the network is established at an authentication step 355.

If the authentication fails, the process resumes at 351. When the authentication is achieved, the mobile terminal sends the access point a message of acceptance (step 356) and awaits confirmation of its own authentication by the access point (test 357). If this confirmation is not obtained, the process resumes at test 351.

If the confirmation is obtained, then the mobile terminal stops transmitting the beacon signal, transmits that for signaling and receives the new beacon signal (step 358). The method then continues in conventional manner, as is summarized on the drawing by "ETC." (step 359).

Figure 8:
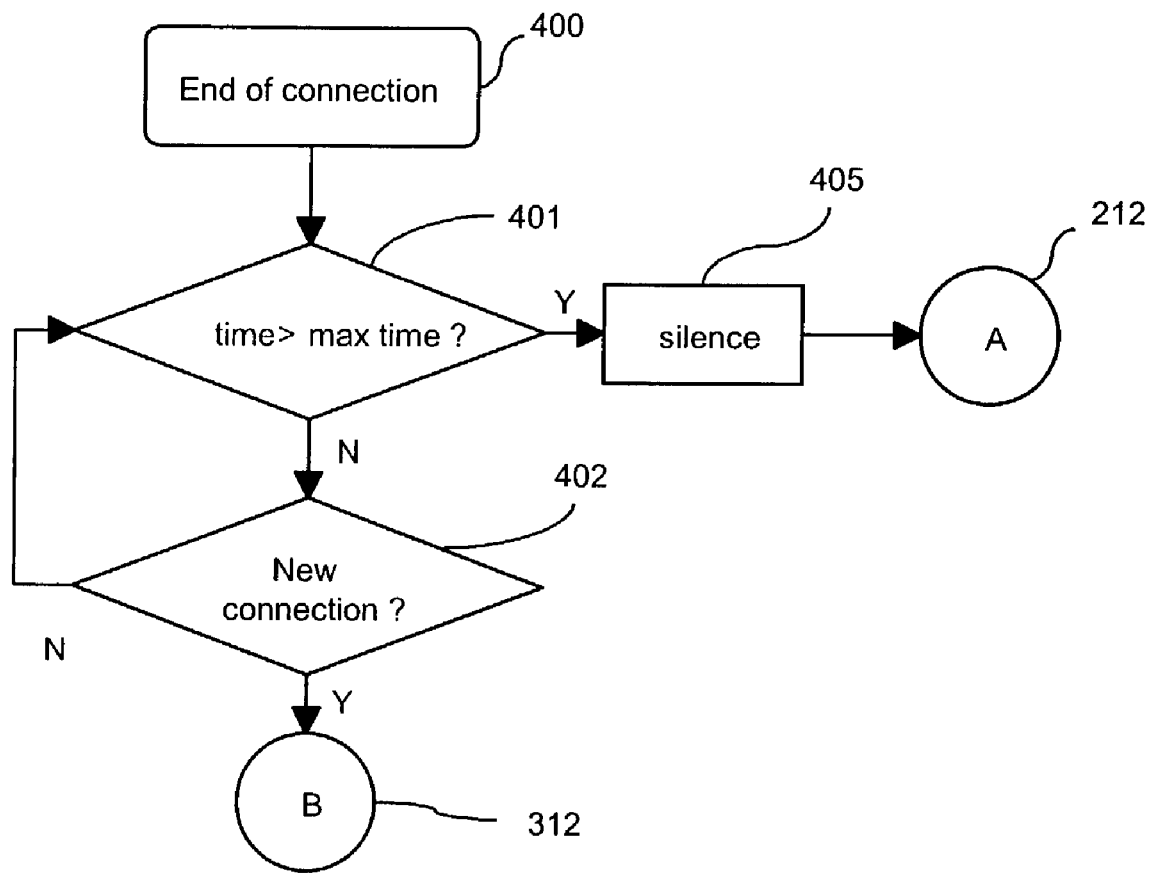
FIG. 8 is a flow diagram illustrating the end of a temporary network, according to the present invention, in a particular embodiment.

The flow chart of FIG. 8 shows the end of the temporary network. When the mobile terminal terminates the connection (step 400), the access point continues to transmit a beacon signal for a predetermined time (step 401), in order permit the possibility of a terminal establishing a new connection.

If a new connection is detected (test 402), the temporary network continues its existence in conventional manner, that is to say that connector B 312 of FIG. 7 is proceeded to.

If the time limit for waiting for a new connection is exceeded (test 401 positive), the beacon signal is no longer transmitted (step 405) and the access point proceeds to the connector A 212, that is to say at step 201 of FIG. 6. As for the mobile terminal, it is deactivated or reactivated by the user.

The algorithms described above may be implemented either in the form of hardware or software.

The invention claimed is:

1. An access point in a wireless communication network, wherein said access point is a station among a plurality of stations in said wireless communication network, and wherein said wireless communication network comprises at least one mobile terminal and wherein said access point and said mobile terminal are not initially connected with each other, said access point comprising:

detecting means for detecting whether or not the mobile terminal transmits a first beacon signal consisting of network management information for allowing the access point to connect to said mobile terminal;

authentication means for performing an authentication procedure with said mobile terminal if said detecting means detects that said mobile terminal transmits said first beacon signal, said authentication procedure comprising a mutual authentication process in which each of the access point and the mobile terminal authenticate the other, and upon a successful authentication, transmit a notification message indicating the same to the other; and beacon signal transmitting means for, when the detecting means detects that the mobile terminal is transmitting the first beacon signal, and where the notification message is received from the mobile terminal indicating that the access point has been successfully authenticated by the mobile terminal, transmitting a second beacon signal in place of said first beacon signal of said mobile terminal in the communication network, the mobile terminal having stopped transmitting the first beacon signal in the communication network upon receiving the notification message transmitted by the access point indicating that the mobile terminal has been authenticated by the access point and after having transmitting the notification message to the access point indicating that the access point has been authenticated by the mobile terminal, wherein said second beacon signal consists of network management information for allowing the mobile terminal to connect to said access point, wherein said access point does not transmit the second beacon signal unless the detecting means detects that the mobile terminal is transmitting the first beacon signal in said network, and wherein, when the authentication procedure results in an unsuccessful authentication of the mobile terminal, or when the access point does not receive the notification message from the mobile terminal, the access point remains silent and does not transmit the second beacon signal.

2. An access point according to claim 1, wherein a first authentication procedure performed by the access point as its part of the mutual authentication process comprises:

sending a random number to said mobile terminal;

performing a predetermined calculation based on said random number, so as to obtain a first result;

receiving, from said mobile terminal, a second result of another predetermined calculation performed by said mobile terminal based on said random number;

comparing the first result and the second result; and authenticating said mobile terminal if said first result and said second result are identical.

3. A mobile terminal in a wireless communication network, wherein said mobile terminal is a station among a plurality of stations in said wireless communication network, and wherein said wireless communication network comprises at least one access point and wherein said access point and said mobile terminal are not initially connected with each other, said mobile terminal comprising:

detecting means for detecting whether or not a beacon signal is currently being transmitted in the wireless network by the access point;

beacon signal transmitting means for, when the detecting means detects that the access point is not transmitting a beacon signal in the wireless communication network, transmitting a first beacon signal consisting of network management information for allowing the access point to connect to said mobile terminal;

authentication means for, when the beacon signal transmitting means is transmitting the beacon signal and the access point detects the beacon signal transmitted by the beacon signal transmitting means, performing an authentication procedure with said access point, the authentication procedure comprising a mutual authentication process in which each of the mobile terminal and the access point authenticate the other, and upon a successful authentication, transmit a notification message indicating the same to the other;

stopping means for, when the authentication procedure performed by the authentication means successfully authenticates the access point and where the notification message indicating that the mobile terminal has been successfully authenticated is received from the access point, stopping the transmission of said first beacon signal by said beacon signal transmitting means and transferring responsibility for beacon signal transmission to the access point; and receiving means for, after responsibility for the beacon signal transmission is transferred to the access point, receiving a second beacon signal from the access point, wherein said second beacon signal consists of network management information for allowing the mobile terminal to connect to said access point.

4. A mobile terminal according to claim 3, wherein said authentication procedure comprises:

sending a random number to said access point;

performing a predetermined calculation based on said random number, so as to obtain a second result;

receiving, from said access point, a first result of another predetermined calculation performed by said access point based on said random number; and comparing said first result and said second result, authenticating said access point if said first result and said second result are identical.

* * * * *